ated Jan. 11, 1955

2,699,457

POLYMERIZATION OF ETHYLENE

Karl Ziegler and Hans-Georg Gellert, Mulheim (Ruhr), Germany

No Drawing. Application June 19, 1951, Serial No. 232,476

Claims priority, application Germany June 21, 1950

21 Claims. (Cl. 260—683.15)

This invention relates to the polymerization of ethylene.

One object of this invention is a method for polymerizing ethylene and ethylene mixtures with other unsaturated hydrocarbons. This and still further objects will become apparent from the following description:

According to the invention ethylene or its mixtures with other unsaturated hydrocarbons can be polymerized by heating the ethylene or such mixtures to a temperature of about 60–250° C. in the presence of hydrides or certain organo compounds of aluminum or the next two higher members of the same group in the periodic system, i. e. gallium and indium, or beryllium in the next preceding group, which act as exceptionally effective polymerization activators.

These new polymerization activators have the general formula $Me(R)n$ in which Me is one of the aforementioned metals, i. e., aluminum, gallium, indium, and beryllium, $n$ is the valence of the metal—i. e. 2 or 3—and R is at least one of hydrogen, monovalent, saturated aliphatic radicles, monovalent aromatic radicles and any combination thereof. Suitable activators according to the invention are, for example, $Be(C_2H_5)_2$, $AlH_3$, $HAl(CH_3)_2$, $H_2AlC_2H_5$, $Al(CH_3)_3$, $Al(C_2H_5)_3$, $Al(C_6H_5)_3$, $Ga(CH_3)_3$, $In(CH_3)_3$, $Be(C_6H_5)_2$ $Al(C_6H_{13})_3$, $Al(CH_2-(CH_2)_{16}-CH_3)_3$, $Ga(C_6H_5)_3$ $In(C_6H_5)_3$ and the like.

These new polymerization activators may also be present in the form of their known and, in many cases, very stable, organic molecule compounds with, for instance, ethers, thioethers or amines, or else in complex linkage with alkali metal hydrides, alkyls, or aryls. Examples of these activator compounds are $NaBe(C_2H_5)_3$, $LiAlH_4$, $LiAl(C_2H_5)_4$, $NaAl(C_6H_5)_4$ and the like.

The polymerization according to the invention is carried out at a temperature of about 60–250° C., and may be carried out at pressures from normal to the highest possible ethylene pressures of for example about 2,000 atmospheres or still higher as may be practically obtained in present operations. The particular reaction product will vary depending on the particular conditions of reaction, and the particular activator used. Thus, for example, normal α-olefins of the general formula $$H(CH_2CH_2)_nCH=CH_2$$

may be obtained when using aluminum or beryllium alkyl and controlling the reaction time so that only partial conversion is effected, i. e. conversions up to about 60%. These normal α-olefins may also be obtained if an activator consisting of the molecular compounds of aluminum trialkyl with ether, thioethers or amines is used. Similarly, activators consisting of complex compounds such as the alkali alkyl and alkali hydride type, as, for example, $LiAl(C_2H_5)_4 LiAlH_4 NaAl(C_2H_5)_3$, will produce these α-olefins. If the temperature is increased to above 200° C. for relatively long periods of time so that substantially complete conversion is effected, olefins having double bonds in the intermediate position are formed. If the temperature is kept from about 60–160° C. at a pressure of about 10–2,000 atmospheres in the presence of either a beryllium or aluminum activator which is present in a molar ratio to ethylene of a magnitude of less than 1/20, then predominantly saturated polymers which are solid at room temperature are formed.

The amounts of activators used in accordance with the invention are not critical for effecting polymerization per se. The type of reaction desired and the polymers to be obtained, however, may be controlled in certain cases by, among other things, limiting the mol ratio of activator to ethylene as, for example, limiting the ratio to a magnitude of about 1:20.

These activators may not be true catalysts in the scientifically strict meaning of the word, as they do not remain during the reaction exactly the same as they were when originally added. They may be present in small nonstoichiometric quantities and still bring about comparatively large conversions. It is thus possible to obtain 500 grams to 2 kgs. of polymer for each gram of activator used. The amount of polymer obtained in relation to the amount of activator depends upon the purity of the ethylene and as little as 0.01% activator will effect these conversions when extremely pure ethylene is used. The activators form compounds with the olefins and such compounds are frequently contained as by-products in the reaction products. In other cases the activators are first of all bound to the polymeric reaction product, so that the polymers first of all have the general formula: [activator.(olefin)$_n$], in which $n$ is a number of at least 2 but not in excess of a value sufficiently high to indicate a polymer above a wax range polymer there being understood by "activator" a portion of the substance which still contains the metal of the originally added metal compound in direct linkage with carbon. In this connection a modified product resulting from the action of olefin may be present instead of the beryllium or aluminum alkali or the like used at the beginning. Examination of the reaction products in connection with these polymerization catalysts has shown that frequently portions of the activator appear themselves in the polymers, for which reason the composition of the polymers would not precisely agree with the formula (olefin)$_n$ in which $n$ is as indicated above. When the expression "polymerization" is used herein and in the claims, there is meant thereby both polymerization in the very strict sense, as well as in its broad sense, in which different substances are combined to form molecules of greater molecular weight. It is a very simple matter to remove the bound metal portions by washing with water, alcohol, acids, or in connection with aluminum and beryllium, caustic solutions. When proceeding in this manner, a small amount of hydrogen equivalent to the bound metal then enters the polymers.

It is also possible to decompose the organo-metallic activators or compounds in the final products by other agents, as, for example, halogens or oxygen or other substances which react with organometallic compounds. In this connection the halogens, oxygen or other elements or groups of atoms will appear in the reaction products in comparatively modest quantities. Such secondary variation possibilities do not affect, however, the crux of the present invention, which resides in the combination of two or more olefin molecules to form compounds of higher molecular weight than the starting substances.

Any olefins may be used for polymerizing with the ethylene, such as purely aliphatic olefins, as ethylene itself, propylene, α-olefins of the formula:

$$C_nH_{2n+1}.CH=CH_2$$

the value of $n$ being as large as desired, 1,2-dialkylethylenes of the general formula $C_pH_{2p+1}.CH=CH.C_qH_{2q+1}$, isobutylene, 1,1-dialkylethylenes, di- and poly-olefins with isolated position of the double bond, for instance, diallyl, butadienepolymers (particularly those which can be obtained from butadiene with alkyl metal aryls or alkali metal) and also cyclic olefins having an aliphatic chain, such as vinylcyclohexenes, and also purely cyclic olefins such as cyclohexene, cyclopentene or dicyclopentadiene. These examples, however, are in no way exhaustive of all the olefins which may be used in accordance with the invention.

The activity of the various olefins is different. Ethylene itself has by far the greatest reactivity. The smallest reactivity is possessed by isobutylene and in general the 1,1-disubstituted ethylenes. The conditions therefore contradict certain findings which have been made previously, in accordance with which isobutylene has been considered very easily polymerizable, while ethylene, on the other hand, was considered difficultly polymerizable. Isobutylene and 1,1-dialkyl substituted ethylenes accordingly are less preferable as starting materials for the polymerization process in accordance with the present invention. Due, however, to the high reactivity of ethylene itself, these products are useful as components for copolymerization therewith. Similar considerations apply also to certain cyclic olefins, such as cyclohexene, The polymerization according to the invention leads to extremely wide and varied final products, depending upon the details of the manner in which the polymerization is effected. If ethylene alone is used, products of the general formula (ethylene)$_n$ are obtained. If ethylene along with different olefins are used for the polymerization reaction, products of the type (ethylene)$_n$+[(ethylene)$_p$.(olefin)$_q$]+(olefin)$_n$ are obtained. It is, however, possible by varying the external conditions to influence the formation of the true copolymer, i. e., (ethylene)$_p$.(olefin)$_q$. In these formulas, $n$, $p$ and $q$ indicate numerical values which are not sufficiently high to indicate a polymer above a wax range polymer, and the only restriction on their lower limit is that $n$ or $p+q$ must be equal at least to 2.

The polymerization of products obtained in accordance with the invention vary widely depending on the mol ratio of activated ethylene, the temperature of the reaction, the pressure of the reaction, the duration of the reaction and the activator used. Thus the average molecular weight of the polymers obtained can be influenced by ethylene pressure and temperature so that with increasing pressure and decreasing reaction temperature ethylene polymers of increasing molecular size are produced.

Example 1

Triethyl aluminum is heated at 200–220° C., and dry, air-free ethylene is passed through the liquid at normal pressure, the discharging gas current contains large quantities of butylene, particularly α-butylene, as well as hexylene and, preferably, α-hexylene. The conversion and quantity ratio of butylene to hexylene can be readily influenced by changing the gas velocity and the time of contact, in the sense that with a higher velocity, the conversion is smaller but the amount of butylene is relatively larger. By re-cycling, predominantly butylene can be produced. With the aluminum alkyl contact agent, higher polymeric ethylenes gradually accumulate, but the contact agent nevertheless remains active for a long period of time.

Example 2

3.6 grams of aluminum triphenylate (Al(C$_6$H$_5$)$_3$) are mixed with 20 cc. of pentane in an autoclave of about 200 cc. contents and from which the air has first been removed being replaced by nitrogen. Ethylene is pressed into the autoclave at a pressure up to 62 atmospheres and at substantially room temperature. The autoclave is agitated by shaking and the temperature raised to 130° C. whereby the pressure increases at first to 110 atmospheres decreasing, however, thereafter during the next five hours to about 10 atmospheres. Additional ethylene is there after again pressed into the autoclave at about the same operational temperature, the ethylene pressure being up to 70 atmospheres. The pressure thereupon again decreased for a period of about 70 minutes down to 38 atmospheres. The ethylene was repeatedly pressed thereafter into the autoclave for a total of three times. A total of 67 grams ethylene is absorbed during the operation.

After releasing a relatively small remnant of ethylene the reaction product is removed from the autoclave and is composed of a substantially colorless wax like polyethylene.

Example 3

23 grams of lithiumaluminumhydride in 800 cc. of diethylether are saturated with ethylene in the cold while in an autoclave of 2 liters content and after the prior removal of air and the substitution thereof by nitrogen and under a pressure of 70 atmospheres. The temperature was slowly raised while the mixture was shaken to about 200° C. A maximum pressure decrease from about a maximum of 580 atmospheres down to about 125 atmospheres occurs within about 24 hours. The reaction mass is permitted to cool whereupon the pressure decreases to a very low insignificant figure. Again ethylene is pressed into the autoclave and the operations are repeated for a total of four times.

After four times repeating the operation, the autoclave is practically filled with substantially liquid reaction products and no further ethylene is absorbed. The reaction product constitutes a readily movable, only slightly colored liquid carrying suspended therein a fine precipitant.

The reaction product is first shaken with concentrated hydrochloric acid for the removal of the ether, the shaking being carried out at ice cold temperature. About one liter of liquid remains. A further working up by distillation with an efficient distillation column yields the following:

Hexen-(1), B. P. 63° C., 130 cc.
Octene-(1), B. P. 120° C., 165 cc.
Decene-(1), B. P. 92° C. (60 mm.), 70 cc.
Dodecene-(1), B. P. 106° C. (24 mm.), 50 cc.
Tetradecene-(1), B. P. 136° C. (24 mm.), 40 cc.
Hexadecene-(1), B. P. 161° C. (24 mm.), 30 cc.

The fact that all of the olefines obtained are essentially substantially uniform alphaolefines is substantiated by the fact that all of the products react only very slowly with benzoyl peroxide (see Kolthoff, Lee and Mairs Journal of Polymer Science 2, 199, 206, 220 (1747)).

A more detailed analysis of the alphaolefine content showed 98% to 99% for hexene, 92% to 93% for octene, and, 80% to 81% for decene and dodecene.

Example 4

9 grams of the compound Al(C$_2$H$_5$)$_3$.¾(C$_2$H$_5$)$_2$O, 50 grams paraffin oil are filled into an autoclave of 200 cc. content under exclusion of air. The autoclave is heated to a temperature of about 160° C. to 180° C. and ethylene is pressed into the autoclave with or under a pressure of 300 to 400 atmospheres. The pressure will rapidly decrease to about 100 to 150 atmospheres and is then again brought back with further ethylene to 350 to 400 atmospheres. A total of four times repetition of ethylene pressed into the autoclave was resorted to. The total time of the reaction was about six hours. There was obtained 137 cc. of oil including paraffin oil from which there were obtained after washing of the aluminum compound with diluted hydrochloric acid 30 cc. by way of a distillate obtained up to a temperature of 127° C. and 12 mm. pressure. 5 cc. of this distilled over at a temperature of from 55° C. to 98° C. and constituted 100% alphaolefine having an iodine number of 250, the olefines being principally alphahexene. There was further obtained 25 cc. of a mixture which was not further separated and containing higher ethylene polymers with an iodine number of 178 and constituting about 92% of alphaolefine. The nondistilled, higher boiling residue contained in addition to the paraffin oil which was used as a solvent further amounts of ethylene polymers of still higher molecular weight.

Example 5

14.4 grams of Al(C$_2$H$_5$)$_3$ are heated while dissolved in 180 cc. of pentane in an autoclave of about 500 cc. contents and thoroughly washed with nitrogen for the purpose of removing air therefrom. The heating was carried to a temperature of about 200° C. to 220° C. Ethylene was pressed into the autoclave to 400 to 450 atmospheres whereby with almost spontaneous temperature increase to 220° C. to 225° C. a pressure decrease to 150 atmospheres was observed within about five minutes, whereupon additional amounts of ethylene to 400 atmospheres were pressed into the autoclave and the operation was repeated another three times. Further amounts of ethylene are then not absorbed any more inasmuch as the autoclave is by that time practically completely filled with liquid. About 340 cc. of the liquid autoclave content may be precipitated in the cold and may be freed from their aluminum by the use of hydrochloric acid. Upon distillation, at first 50 grams butylene are obtained whereupon the solvent, i. e. the pentane distills over. Finally, there are distilled over 45 grams ethylene polymers of a boiling point of from 52° C. to 160° C. as well as 30 grams of higher polymers of a boiling point from 88° C. to 168° C. at 10 mm. pressure. There remain approximately 15 grams of high boiling residue. Both of the liquid fractions are substantially free from alphaolefine having an iodine number of about 190 and 156 respectively.

The disappearance of the alphaolefines in this example, in spite of the relatively short reaction time is caused by the relatively high operational temperature which in most cases exceeds about 220° C. as well as also by reason of the use of a relatively pure aluminum trialkyl without the presence of ether. The extent to which the nature of the reaction products may be varied in each case by the reaction conditions is shown in the following table. In each case 2 cc. of $Al(C_2H_5)_3$ were heated with ethylene in an autoclave of about 200 cc. contents and without benefit of solvent. This autoclave was connected by way of a capillary with a larger container of appropriately compressed cold ethylene (500 cc. container up to 70 atmospheres' pressure, 1000 cc. container at higher pressures). Even when proceeding in this manner, ethylene had to be pressed into the autoclave several additional times though it was in this case easier than in the above described procedure to substantially maintain the below referred to pressure limits:

| Test | Test Temp., Degrees | Press. Excess Atmos. | Test Period, Hours | Yield of Polymer, g. | Percent By Weight | | | Percent Residue | Alpha Olefines, $C_6, C_8$ |
|---|---|---|---|---|---|---|---|---|---|
| | | | | | $C_4$ | $C_6$ | $C_8$ | | |
| 1 | 162 | 60-33 | 6.5 | 75 | 24.5 | 5.5 | 7 | 63 | 74 / 62 |
| 2 | 175 | 60-30 | ca .5 | 67 | 32 | 17 | 14 | 37 | 49 / 28 |
| 3 | 200 | 60-37 | 2.5 | 87 | 26.5 | 21.5 | 18 | 34 | 35 / 20 |
| 4 | 220 | 62-35 | 3.5 | 87 | 21 | 29 | 24 | 26 | 9 / 3 |
| 5 | 220 | 60-40 | 5 | 68 | 29.5 | 25 | 21.5 | 24 | 4 / 0 |
| 6 | 240 | 62-50 | 3.5 | 62 | 27.5 | 33 | 18.5 | 21 | 1 / 0 |
| 7 | 185 | 110-75 | 1-2 | 101 | 11 | 15 | 16 | 58 | 85 / 66 |
| 8 | 200 | 111-54 | 1-2 | 109 | 18 | 19 | 19 | 44 | 55 / 40 |
| 9 | 185 | 230-150 | 1½ | 100 | 24 | 14 | 15.5 | 46.5 | 87 / 65 |

*Example 6*

Example of 4 is repeated except that in this case there is used a solution of 30 grams aluminiumtrioctadecyl in 100 cc. ether as the activator for the reaction. This solution may be easily obtained by the dropwise adding of an ether solution of aluminum chloride to an ether solution of octadecylmagnesium chloride. The reaction proceeds in substantially the same manner yielding substantially the same results as set forth in accordance with Example 4.

*Example 7*

6 cc. of aluminumtri-n-hexyl-(1) are heated under exclusion of air in an autoclave of about 500 cc. contents with a well purified and especially air and acetylene free ethylene under pressure to a temperature of 140° C. and shaking. The pressure is substantially maintained by frequently pressing additional ethylene into the autoclave, the pressure being kept at about 110 to 160 atmospheres and the operation being continued until no further appreciable ethylene absorption is observed. This is coincident with the autoclave being substantially filled with polymer material. There is obtained 350 to 400 grams of a paraffin like material having a melting point of from 70° to 80° C.

*Example 8*

If in Example 7 the amount of the activator is reduced to 1 cc. and the ethylene pressure is increased to from 500 to 400 atmospheres, the finally obtained polymer will have a melting point of from 110° C. to 120° C. When very carefully operating utilizing the purest possible ethylene the amount of activator may be still further decreased and it is possible to obtain with but 0.1 gram of activator up to 1000 grams of a polymer which upon extraction with hot acetone, at which only very little is removed by solution, shows a melting point of up to 130° C. This product is thickly viscous upon melting and can be pulled to form threads. The technically important properties of the polymer are still further improved when the ethylene pressure is increased to from 1000 to 2000 atmospheres.

*Example 9*

Example 7 is repeated except that 2 cc. of berylliumdiethyl are used as the activator material and that the heating is carried out to a temperature of about 60° C. to 80° C. The results are substantially the same as those recited in Example 7.

*Example 10*

5 grams of indiumtriethyl are heated in an autoclave with 66 grams of ethylene to a temperature of about 140° C. and an initial pressure of about 400 atmospheres. Pressure decrease is observed and the ethylene is converted into a soft paraffin type material of a melting point of about 30° C. to 40° C.

If in this example there is substituted for the indiumtriethyl 5 grams of indiumtriphenyl or galliumtrimethyl or galliumtriphenyl substantially the same results are obtained.

If the temperature in Examples 2 and 3 is maintained for a relatively long period of time at above 200° C., olefins having double bonds in the intermediate positions occur in the reaction products to an increasing extent, inasmuch as the double bond migrates in the presence of the organometallic compounds mentioned above. In addition, 1,1 dialkylated ethylenes of the general type

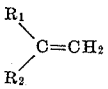

$$\begin{array}{c} R_1 \\ \phantom{R}\diagdown \\ \phantom{RR}C = CH_2 \\ \phantom{R}\diagup \\ R_2 \end{array}$$

are produced so that the composition of the polyethylene becomes more complicated. By carrying out the method properly in the manner above set forth, it is, however, a simple matter to avoid these complications and obtain predominantly α-olefins. The resin formation and discoloring which is characteristic of polymerization with halogen-containing aluminum or boron compounds, as, for example, $AlCl_3$ and $BF_3$, does not occur in the process according to the invention. If worked up suitably, the high-boiling metal and especially the aluminum-containing contact agent remains entirely in the distillation residue and can be repeatedly used over again without further treatment.

Instead of aluminum alkyls or aryls, Examples 1 and 2 may be carried out with other of the herein named activators and especially triethyl aluminum etherates, aluminum hydride, lithium aluminum hydride, lithium tetraethyl aluminum, all preferably in etherial solution. Such materials as $AlH_3$ and $LiAlH_4$ are normally unstable under the experimental conditions. These compounds, however, first of all combine with ethylene in accordance with the invention to form the more stable, entirely or partially ethylated types, such as $AlH(C_2H_5)_2$, $Al(C_2H_5)_3$, $LiAl(C_2H_5)_4$, and the like, which then activate the ethylene to polymerization in the same manner as indicated in Example 2. Naturally, it is also possible to start from $AlH(C_2H_5)_2$, $LiAl(C_2H_5)_4$ and the like, which have been previously separately synthesized.

In connection with the manner of operation set forth in Examples 7, 8 and 9, the metal remains for the time being, as stated above, bound with the polymers. Such products, when brought into contact with air, first become warm, due to the auto-oxidation of the organically bound metal portion without an essential change in their properties. It is, however, preferable to treat these compounds with water, acids, alcohols or the like after the oxidation. The products which can be recovered in this manner are, depending on the reaction conditions involved, soft paraffins, hard paraffins and resin-like polyethylenes of the type of the various well-known "polythene" brands.

As was stated above, the nature of the individual products obtained depends on
 (a) The mol ratio of activator to ethylene;
 (b) The temperature of the reaction;
 (c) The duration of the reaction and thus indirectly on the pressure during the reaction;
 (d) The metal of the activating metal akyl.

The average degree of polymerization in the limiting case can be very close to the mol ratio mentioned under "a." The polymers treated with water or the like with the exclusion of air are then practically completely saturated, straight chain, unbranched paraffins.

In the normal case, the average degree of polymerization is less than the mol ratio of activator to ethylene, particularly at a somewhat increased temperature of reaction and with a prolonged time of reaction and therefore indirectly at a lower ethylene pressure. In this case the reaction products contain unsaturated portions, inasmuch as the entire reaction scheme begins to shift towards the results described in detail in Example 2.

Technical advantage can be made of the above. In the preparation of polyethylenes of a decided paraffin-like nature, if the molecular size is advantageously controlled by the proper adjustment of the temperature and ethylene pressure, a much smaller amount of catalyst will be sufficient than if extra mild conditions were used and it were endeavored to form completely saturated paraffins directly.

On the other hand, in order to prepare products of particularly high molecular weight, it will be endeavored to attain the above-mentioned limiting case as far as possible. The necessary quantities of activator are then, in any event, so small that they are of no importance from an economic standpoint. In this connection, one should therefore start from very small quantities of contact agent and by careful supervision of the reaction and suitable cooling, maintain the temperature at the above-indicated lower limit (80 to 90° C.), in which connection one can furthermore, by a suitable increase of the ethylene pressure up to 2,000 atmospheres, see to it that the reaction takes place easily and does not slow down. In contradistinction to many of the previously known methods for the preparation of polyethylenes of particularly high molecular weight, the use of such extremely high pressure is, according to the invention, not an absolutely necessary prerequisite for the preparation of such substances. It is possible also to operate at pressures below 100 atmospheres and even at pressures down to 10 atmospheres, only in this case the process will take a correspondingly longer period of time. A further advantage of the new method consists therein that the polymer is gradually built up as a junction of the ethylene added and that at every moment, the polymer which has already formed, can add further ethylene with a further increase of the molecular weight as long as it still contains intact organo-aluminum or beryllium. Such a manner of operation brings about advantages in connection with an effective leading away of the heat of reaction and also for this reason it is possible, in connection with the new method, to operate with a practically complete conversion while the previously known processes for the preparation of "polyethylene" used recycled ethylene with only partial conversion in a single passage.

The only disturbance to which attention must be paid in connection with this special variant of the present method is brought about by possible contaminations of the ethylene. Organometallic activators are sensitive compounds which easily react with oxygen, $CO_2$, moisture and other substances and are decomposed thereby. Normal commercial ethylene always contains some such admixtures and this means that the quantity of the polymerization activator cannot be reduced to any desired extent. The mol ratio of ethylene to activator which actually is used in the polymerization equation is uncertain in case of extra small quantities of activator and dependent on the greater or lesser accidental purity of the ethylene. The reaction may furthermore not take place at all if too little activator was used or if the ethylene is very impure.

This difficulty can be avoided in various manners, for example by successively forcing small quantities of the activator at room temperature into a supply of ethylene which is under a high pressure, withdrawing samples in small pressure-proof vessels after proper mixture, and determining in said vessels after warming, whether the polymerization is already starting or not. This test is facilitated by the fact—as has been found—that the organometallic activators readily dissolve in ethylene at high pressure, so that the specimens taken must always receive the necessary quantity of activator. In this manner, the contaminations of the ethylene can, so to say, be "titrated away."

More simply, however, the ethylene supply is pretreated at room temperature and under a pressure of not substantially more than 50 atmospheres with a sufficient quantity of the activator (which may also be dissolved in a suitable inert solvent of high boiling point)—trialkyl aluminum, which is cheap, is preferably used—and thereupon the ethylene, which, under these conditions, is free of activator and contaminations, is introduced directly or after another intermediate compression, into the hot reaction chamber containing a measured quantity of activator.

It has at times also been noticed that the ethylene contains contaminants which only react with the aluminum alkyl at high temperatures at which polymerization of the ethylene can be expected. In such cases, the ethylene is preferably first of all purified by adding a suitable quantity, for instance 0.5 to 1% trialkyl aluminum heated until the beginning of the polymerization, and then again cooled. In this connection, a given fraction of, for instance, 5 to 20% of the ethylene, depending on the conditions, is converted into a low molecular paraffin. The ethylene which is still not polymerized is then finally polymerized in the above-described manner with a measured quantity of activator. In such cases, the preparation of a low molecular and of a high molecular product are suitably coupled with each other.

Finally, it has been found that certain organo-metallic compounds different from the activators and particularly zinc alkyls, do not disturb the polymerization but remove all contaminants except $CO_2$, which are incompatible with the process in the sense set forth above. In so far, therefore, as ethylene which is entirely free of $CO_2$ is used—and this condition can easily be fulfilled—small quantities of zinc alkyls or the like can be added to the polymerization additions even directly before the addition of the activators proper and preferably heated.

These are embodiments of the new polymerization method which do not impair the large range of its applicability and must only be taken into consideration in connection with very impure olefins or when it is intended to produce products of very high molecular weight.

By taking into consideration the viewpoints set forth in detail herein, there is obtained without any special difficulty for every gram triethyl aluminum or diethyl beryllium used, about 500 grams to 2 kgs. colorless "polyethylene" of a melting point of 110 to 135° C., which is thickly viscous in molten condition and forms very strong threads, as is known in connection with higher polyethylenes of molecular weights of about 10,000 to 30,000. The action of the small amounts of activator, which is calculated on a per mil basis, is, however, by no means exhausted in this reaction.

*Example 11*

Mixtures of propylene and ethylene are heated in an autoclave at 200–220° C. with from a few parts per thousand to a few parts per hundred of $LiAlH_4$ activators. Liquid reaction products are formed which represent complicated mixtures of the most varied components. When separated by distillation in effective columns, up to the $C_8$ range, the following hydrocarbons are found:

| (1) Butene-(1), B. P. 6° | (2) n-pentene, 33° | (3) 2-methyl-butene-(1) 31° |
|---|---|---|
| (4) n-hexene, 64° | (5) 2-methylpentene (1), B. P. 63° | (6) n-heptene, 95° |
| (7) 2-methyl-hexene (1), 91°; 2-ethyl-pentene-(1), 94° | (8) n-octane, 123° | (9) 2-methylheptene-(1), 119° 119° | of which compounds 1, 4 and 9 must have been produced exclusively from ethylene, compound 5 exclusively from propylene and the others from ethylene plus propylene, compounds 2 and 3 being from 1 ethylene+1 propylene, compounds 6 and 7 from 1 propylene+2 ethylene, and No. 9 from 2 propylene+1 ethylene. In view of this, the assumption is justified further that such co-polymers between ethylene and propylene are present in the higher boiling fractions.

*Example 12*

The procedure in Example 7 was followed, using as activators Al(CH$_3$)$_3$; Al(C$_2$H$_5$)$_3$; Al(C$_6$H$_5$)$_3$; AlH$_3$; AlH(C$_2$H$_5$)$_2$ and LiAl(C$_2$H$_5$)$_4$, respectively. The same results were obtained and the same components were separated by distillation as were separated in Example 7.

This co-polymerization is not restricted to the above-described combination. For example, when distilling a product prepared at 185° from heptene-(1) and 2½ times its weight of ethylene at a pressure of 140 atmospheres, and a quantity of Al(C$_2$H$_5$)$_3$ equal to 10% of the heptene, it was possible to determine in a definite manner olefins having 9 and 11 carbon atoms which could only have been produced from heptene and 1 or 2 mols of ethylene.

*Example 13*

Propylene is first of all heated with aluminum hydride to 120–130° C., in which connection it first of all absorbs the activator in equivalent quantities, forming a reactive intermediate compound. Thereupon, the unfixed propylene which would disturb the subsequent reaction, is blown off and ethylene is introduced under pressure at 100–120°. The reaction product can then either be decomposed with water, so that a mixture of normal hydrocarbons of the general formula C$_3$H$_7$(CH$_2$.CH$_2$)$_n$H, in which $n$ depends on the quantity of ethylene, is obtained, or any excess ethylene present can be blown off, and a different unsaturated component added for further reaction. If, propylene is now again added (in excess) and if the temperature is increased to 200° C., there is formed in addition to dimeric propylene mixtures of hydrocarbons of the general formula:

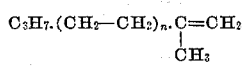

$$C_3H_7.(CH_2-CH_2)_n.C=CH_2$$
$$\phantom{C_3H_7.(CH_2-CH_2)_n.C}|$$
$$\phantom{C_3H_7.(CH_2-CH_2)_n.}CH_3$$

which, therefore, consists of $n$ molecules ethylene and one propylene at the beginning and at the end.

Though the aluminum hydride used in Example 1 is preferred, the reaction as set forth may be effected with any of the mentioned activators according to the invention.

Of course, in accordance with this principle, one can also polymerize different olefins at the two ends of the polyethylene, for instance, first of all isobutylene and thereupon vinylcyclohexene and the like. In accordance with the same principle, in particular also the low viscous butadiene polymers which have become known as "Zahlenbunas" can have their properties modified by polymerizing ethylene into them. The degree of unsaturation of the products is decreased and they are imparted a higher viscosity. Such a modification also takes place even upon merely heating with aluminum or beryllium compounds alone. Obviously, the side position vinyl groups present in large number in the butadiene polymers react with each other with the formation of mutual linkages.

*Example 14*

A mixture of ethylene and propylene is passed through aluminum triethyl in an autoclave under a pressure of from one to several atmospheres (preferably below 10 atmospheres), the temperature being maintained at from 200° to 220° C. Reaction gases are continuously removed. They contain among others

$$CH_3.CH_2.CH_2.CH=CH_2$$

and

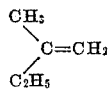

$$\begin{array}{c}CH_3\\ \diagdown \\ C=CH_2\\ \diagup \\ C_2H_5\end{array}$$

which both constitute relatively simple mixed polymerization of ethylene and propylene. There are further found in these gases products of the general formula

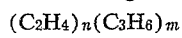

$$(C_2H_4)_n(C_3H_6)_m$$

in which $n$ and $m$ are relatively small numbers and preferably 1, 2, 3 or 4.

*Example 15*

Aluminum triphenyl Al(C$_6$H$_5$)$_3$ is diluted with ten times its volume of pentane. The diluted aluminum triphenyl is then heated in an autoclave with thirty times the mol equivalent amount of mixture of ethylene and propylene at a pressure of about 500 atmospheres maintaining the temperature at about 180°. A vigorous reaction is soon observed resulting in a temperature increase. The gas pressure rapidly decreases and additional amounts of the ethylene propylene mixture are pressed into the autoclave. The resulting products constitute a more or less complicated mixed polymer between ethylene and propylene.

*Example 16*

The mixed polymerization set forth in Example 11 was carried out substantially maintaining the same reaction conditions except that aluminum trimethyl Al(CH$_3$)$_3$ or aluminum triethyl Al(C$_2$H$_5$)$_3$ is used as the activator material and that mixtures of ethylene with respectively α-butene, α-pentene, α-hexene, dodecene-(1) or hexadecen-(1) are used. Polymerization with these various components and activators proceeded in a manner similar to that set forth in Example 11 resulting also in more or less complicated polymerization reaction products containing an olefin reaction constituent.

Due to these innumerable combinations and embodiments which may be followed without departing from the spirit of the invention, the terms and examples are not intended to limit the invention, the invention being limited by the appended claims or their equivalents.

We claim:
1. Method for the polymerization of ethylene and mixtures of ethylene with other unsaturated hydrocarbons into polymers ranging from butylene to wax range polymers which comprises maintaining a starting mixture selected from the group consisting of ethylene and mixtures of ethylene with other unsaturated hydrocarbons at a temperature of about 60° to 250° C. in the presence of a metal polymerization activator comprising a metal selected from the group consisting of beryllium, aluminum, gallium and indium having the valence linkages thereof individually bound to members selected from the group consisting of hydrogen, monovalent saturated aliphatic organic hydrocarbon radicals, and monovalent aromatic organic hydrocarbon radicals and recovering a polymerization product.

2. Method according to claim 1 in which said polymerization activator is in the form of a molecular compound, the non-activator component of which is at least one member of the group consisting of ethers, thioethers and amines.

3. Method according to claim 1 in which said polymerization activator is in the form of a complex compound, the non-activator component of which is at least one member of the group consisting of alkali-hydrides, alkali-alkyls and alkali-aryls.

4. Method according to claim 3 in which said complex compounds are lithium compounds.

5. Method according to claim 1, in which said starting mixture is maintained at said temperature in the presence of at least one organic solvent.

6. Method according to claim 1, in which the ethylene is purified prior to said temperature maintaining by contact with a zinc alkyl.

7. Method according to claim 1 in which said starting mixture is maintained at a temperature of about 60° to 160° C. at a pressure of about 10 to 2000 atmospheres, and in which said metal polymerization activator is present in amount not exceeding 1/20 of the molar amount of ethylene, and in which the polymerization product recovered is a metal-containing ethylene polymer solid at about room temperature.

8. Method according to claim 1 in which said metal polymerization activator is a metal alkyl.

9. Method according to claim 1 in which said metal polymerization activator is a metal aryl.

10. Method according to claim 1 in which said metal polymerization activator is a hydrocarbon substituted metal hydride retaining at least one hydrogen atom in valence bond.

11. Method for polymerizing ethylene into polymers ranging from butylene to wax range polymers which comprises maintaining ethylene at a temperature of about 160° to 220° C. at increased pressure in the presence of a metal polymerization activator consisting of a metal selected from the group consisting of beryllium, aluminum, gallium and indium having the valence linkages thereof individually bound to members selected from the group consisting of hydrogen, monovalent saturated aliphatic organic hydrocarbon radicals and monovalent aromatic organic hydrocarbon radicals, and recovering mixtures of olefins.

12. Method for polymerizing ethylene into polymers ranging from butylene to wax range polymers which comprises maintaining ethylene at a temperature of about 60° to 200° C. in the presence of a metal polymerization activator comprising a metal selected from the group consisting of beryllium, aluminum, gallium and indium, having the valence linkage thereof individually bound to members selected from the group consisting of hydrogen, monovalent saturated aliphatic organic hydrocarbon radicals and monovalent aromatic organic hydrocarbon radicals, until an amount of ethylene not exceeding 60% is polymerized, and recovering mixtures of olefins containing large quantities of $\alpha$-olefin.

13. Method according to claim 12 in which said polymerization activator is a molecular compound of aluminum trialkyl with at least one member of the group consisting of ethers, thioethers and amines.

14. Method according to claim 12 in which said polymerization activator is in the form of a complex compound with at least one member of the group consisting of alkali hydrides and alkali alkyls.

15. Method according to claim 14 in which said complex compounds are lithium compounds.

16. Method for the polymerization of ethylene into polymers ranging from butylene to wax range polymers which comprises maintaining ethylene at a temperature of about 200° to 250° C. in the presence of a metal polymerization activator consisting of a metal selected from the group consisting of beryllium, aluminum, gallium and indium having the valence linkages thereof individually bound to members selected from the group consisting of hydrogen, monovalent saturated aliphatic organic hydrocarbon radicals, and monovalent aromatic organic hydrocarbon radicals, until substantially complete conversion is effected and recovering mixtures of olefin containing large quantities of olefin having a double bond in the intermediate position.

17. Method for polymerizing mixtures of ethylene and other unsaturated hydrocarbons into polymers ranging from butylene to wax range polymers which comprises preheating such mixtures in the presence of a metal polymerization activator comprising a metal selected from the group consisting of beryllium, aluminum, gallium and indium, having the valence linkage thereof individually bound to members selected from the group consisting of hydrogen, monovalent saturated aliphatic organic hydrocarbons radicals and monovalent aromatic organic hydrocarbon radicals, cooling the preheated mixture separating the excess olefin from the polymerization activators, maintaining the remaining mixture at a temperature of about 60 to 200° in the presence of said activator and recovering a polymerization product.

18. Method of polymerizing ethylene with other unsaturated hydrocarbons into polymers in the liquid to wax range which comprises maintaining ethylene at a temperature between 60 and 150° in the presence of a metal polymerization activator comprising a metal selected from the group consisting of beryllium, aluminum, gallium and indium, having the valence linkage thereof individually bound to members selected from the group consisting of hydrogen, monovalent saturated aliphatic organic hydrocarbon radicals and monovalent aromatic organic hydrocarbon radicals, adding such other unsaturated hydrocarbons, maintaining the mixture at a temperature not in excess of 220° C. and recovering a polymerization product.

19. Method according to claim 18 in which prior to said addition of the other saturated hydrocarbon, any excess alkylene is removed.

20. Method according to claim 18, in which after completion of the reaction with the second unsaturated hydrocarbon, its excess is removed, and it is again treated with alkylene.

21. Method according to claim 18 in which after the termination of the reaction with the second unsaturated hydrocarbon, the excess is removed and the reaction product is treated with a third unsaturated hydrocarbon.

References Cited in the file of this patent

UNITED STATES PATENTS

| Number | Name | Date |
|---|---|---|
| 2,377,779 | Hanford | June 5, 1945 |
| 2,409,996 | Roedel | Oct. 22, 1946 |